United States Patent [19]

Yuan

[11] 4,412,426

[45] Nov. 1, 1983

[54] WISER COOLING SYSTEM

[76] Inventor: Shao W. Yuan, 6701 Montour Dr., Falls Church, Va. 22043

[21] Appl. No.: 276,648

[22] Filed: Jun. 23, 1981

Related U.S. Application Data

[63] Continuation-in-part of Ser. No. 218,800, Dec. 22, 1980, Pat. No. 4,346,569, which is a continuation-in-part of Ser. No. 951,518, Oct. 13, 1978, Pat. No. 4,240,268.

[51] Int. Cl.³ .............................................. F25D 23/12
[52] U.S. Cl. ......................................... 62/260; 165/45
[58] Field of Search ................. 165/45; 62/260, 235.1, 62/119

[56] References Cited

U.S. PATENT DOCUMENTS

| | | | |
|---|---|---|---|
| 1,725,906 | 8/1929 | Gay | 62/119 X |
| 3,965,694 | 6/1976 | Vignal et al. | 62/260 |
| 4,011,736 | 3/1977 | Harrison | 165/45 X |
| 4,135,371 | 1/1979 | Kesselring et al. | 62/119 X |
| 4,142,576 | 3/1979 | Perry et al. | 62/260 X |
| 4,257,239 | 3/1981 | Partin et al. | 62/260 X |
| 4,258,780 | 3/1981 | Suo | 62/260 X |
| 4,277,946 | 7/1981 | Bottum | 62/238.6 X |

Primary Examiner—Lloyd L. King
Attorney, Agent, or Firm—William H. Holt

[57] ABSTRACT

A system for transmitting, storing and utilizing cold which includes the use of mechanical refrigeration equipment for tramsmitting cold to cool anti-freezing liquid in a cold storage chamber which in turn freezes water in bags installed in the cold storage chamber. When an air-conditioning system in a cooling environment is in operation, coolant in the cold storage chamber will be circulated through a bank of tubes situated inside the air-conditioning duct for cooling air as required. The system provides for long-duration storage of coolant which can be effectively used during warm seasons for space cooling and cold storage.

5 Claims, 2 Drawing Figures

WISER COOLING SYSTEM

This is a continuation-in-part of my pending application Ser. No. 06/218,800, filed Dec. 22, 1980, U.S. Pat. No. 4,346,569 granted on Aug. 31, 1982, which is a continuation-in-part of application Ser. No. 951,518, filed Oct. 13, 1978, and now U.S. Pat. No. 4,240,268, granted on Dec. 23, 1980.

BACKGROUND OF THE INVENTION

1. Field of the Invention

The present invention relates to utilizing mechanical refrigeration, and more particularly to a system for transmitting and storing cold medium, preferably underground, for effective uses during summer seasons. This system is called WISER, meaning Winter Ice For Summer Energy Relief.

2. Description of the Prior Art

Prior art ground cold storage systems are generally accomplished by blowing winter cold ambient air through a cold reservoir formed by a bed of crushed stones and rock. In other cases, cold liquid medium is pumped through pipes embedded in stone and rock medium in the form of which constitutes a closed heat-exchange system.

The stones and rocks, as a cold storage reservoir, have several shortcomings. First, cold storage capacities are limited because of the narrow temperature range for cooling. In other words, the difference of storage temperature in winter and upper-limit useful temperatures in summer is less than thirty degrees Fahrenheit (30° F. to 60° F). For example, in a volume of one cubic foot of stone at a temperature difference of 30° F., the energy flux is about $1.3 \times 10^3$ BTU. Assuming a summer requirement of $25 \times 10^6$ for an average size home, a volume of cold storage required for cooling is estimated at $20 \times 10^3$ cubic feet. In contrast to this large volume, if ice is used for cold storage instead of rock, the required storage volume is about $2.5 \times 10^3$ cubic feet.

Another shortcoming of the stone and rocks as cold storage is the low thermal conductivity. It would require a long length of liquid pipes and considerable pumping power in order to meet the maximum cooling rate required during hot summer days.

Furthermore, the ground cold storage systems mentioned above can be only applied to regions where sufficient freezing climate exists.

SUMMARY OF INVENTION

This invention relates to a system for transmitting, storing and utilizing cold produced by mechanical refrigeration, and more particularly, to a system in which cold medium can be stored underground for subsequent cooling utilization during summers without relying on conventional air-conditioning systems.

The invention contemplates a novel system for transmitting, storing and utilizing cold wherein the system comprises means for transmitting cold produced by mechanical refrigeration to freeze bags of water in a reservoir below the surface of the ground, the circulation means to circulate the stored cold to a ventilation air duct which cools and dehumidifies the returning warm air flow from the space cooling in an air-conditioning system.

For accomplishing the foregoing objective, the invention contemplates the use of mechanical refrigeration for transmission of the cold to an underground cold storage chamber which contains anti-freeze. The anti-freeze in the chamber is cooled and finally reaches temperatures below 32° F. during the cold and cool seasons. In turn, when the anti-freeze reach 32° F. or below, it freezes water inside plastic bags which are installed in the cold storage chamber. According to the coefficient of performance for any refrigeration system, more than 50% of electric energy can be saved if the system is operated at an average of 55° F. atmospheric environment instead of that at an average of 95° F. environment. The present invention suggests that mechanical refrigerating equipment in this novel WISER system be operated during the cold and cool seasons for ice generation.

The extraction of cold from the cold storage chamber for space cooling and cold storage is accomplished by pumping coolant liquid from the chamber through a closed piping loop. When air conditioning is in operation the coolant is pumped from the chamber through the piping loop to a bank of tubes situated in a conventional ventilation air duct system. As the returning warm air from rooms or other environment passes the bank of coolant tubes in the ventilation air duct, it loses heat to the coolant in the tubes. The coolant then flows back through the piping loop to the cold storage chamber. In the process of coolant recirculation in the storage chamber, the coolant is cooled by the ice with the bags and the coolant circulation cycle repeated.

Accordingly, an important object of the invention is to provide for long-duration underground storage of cold which can be used for space cooling and cold storage when air-conditioning is required.

A further and important object of the invention is to provide a cold storage system using mechanical refrigeration for ice making during cold and cool seasons in regions even if freezing climate seldom exists.

A still further and very important object of the invention is to provide means for relieving the peak power demand on electric utility systems during the summer, thus reducing considerable capital investments of the utility industry.

A still further and important object of the invention is to provide means for operating mechanical refrigerating equipment during cold and cool months, thus saving considerable electric energy for the users of air-conditioning equipment.

A still further object of the invention is to provide a highly efficient means for transmitting cold from a mechanical refrigerating system into the ground for cold storage through the use of cooling coils and heat pipes.

A still further object of the invention is to provide a plurality of bags containing water inside the cold storage chamber or reservoir which is filled with anti-freeze liquid; thereby a considerable increase in heat transfer rate between the cooling coils or heat pipes and the anti-freeze liquid can be achieved. This in turn, increases the rate of ice forming.

A still further object of the invention is to provide means to make and store ice in an underground reservoir, thereby a considerable reservoir volume can be reduced for the same cold storage capacity of conventional beds of stones and rock.

Further objects and advantages of my invention will become apparent from an understanding of the following detailed description of the preferred embodiments of my invention.

DESCRIPTION OF THE PREFERRED EMBODIMENTS

Figure 1:
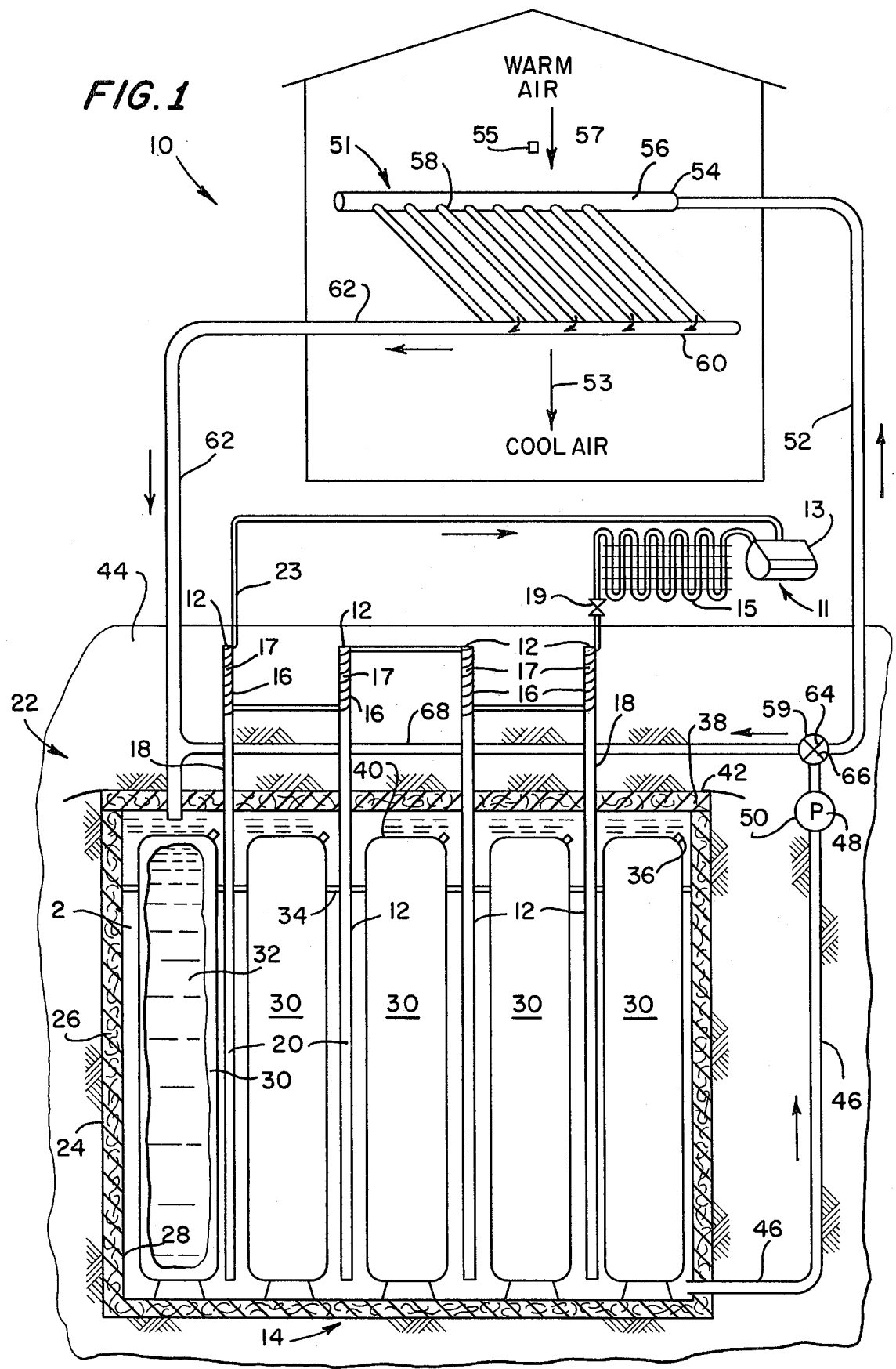
FIG. 1 is a diagrammatic section view of a system for transmitting, storing and utilizing cold by employing heat pipes and auxiliary mechanical refrigeration equipment in accordance with the present invention.

Referring to FIG. 1, the novel transmitting, storing and utilizing system of mechanical refrigeration, generally indicated by the numeral 10, includes an artificial or mechanical refrigerating unit 11 and a series of heat pipes 12 for collecting and transmitting cold from cooling coils 17 into an underground tank 14 which contains liquid coolant 2. The liquid coolant 2 remains in liquid state under all refrigeration conditions that may be transmitted by the heat pipe or cooling coils to the liquid coolant. Each heat pipe 12 include a condenser section 16, an adiabatic section 18, and an evaporator section 20 as well as containing a working fluid (not illustrated). Briefly, cold is absorbed by the condenser section 16 which causes the vapor therein to condense, and the condensed liquid then flows downward through the adiabatic section 18 to the evaporator section 20 which is located inside the liquid coolant tank 14. The condensed working fluid in the evaporator section 20 of the heat pipe extracts heat from the surrounding liquid coolant 2 and the working fluid changes its phase to vapor which then flows upward to the condenser section 16, and the cold absorption and heat extraction cycle repeated.

The mechanical refrigerating unit 11 consists of a compressor 13, powered by electric motor (not shown), a condenser 15 and cooling coils (evaporator) 17. The low-pressure refrigerant vapor from the cooling coils (evaporator) 17 passing through passage or pipe 23 is inducted into the compressor 11, which rises the vapor in pressure and temperature for delivery to the condenser 15. After heat removal (by the circulating air or water) and condensation in the condenser, the liquid refrigerant may pass first to a receiver (not shown) and next through the expansion valve 19 to the evaporator 17. In the evaporator 17 the liquid refrigerant, in vaporizing, absorbs heat from the condenser section 16 of the heat pipes 12 before being inducted into the compressor 11.

An insulated chamber, generally indicated by the numeral 22, contains the liquid cooling tank 14. This chamber 22 may be located in any available space but, preferably, is located underground to take advantage of the natural earth temperature. The pit or chamber 22 is coated with a layer of foam synthetic plastics 24 and lined with rigid insulation material 26 which would hold its shape under hydrostatic pressure. The interior surface of the insulation 26 is lined with a plastic sheet barrier 28. The shape of the chamber 22 can be cylindrical, cubic or any other suitable form which encloses a plurality of plastic bags 30 containing water 32 and is substantially filled with liquid coolant 2. On the other hand, the tank 14 can be prefabricated like concentric rigid shells with insulating material in between. The size and the skin thickness of the water bags 30 are determined by the heat transfer rate between the liquid coolant 2 and water 32. Furthermore, the plastic material of the water bags 30 must have sufficient strength to withstand the hydrostatic pressure of water 32 and sufficient elasticity to expand when water 32 freezes. The bags 30 are held in place by elastic supporters 34 and have filling tubes 36 in order that the bags 30 can be filled with water after the installation of the bags.

When the compressor 11 is in operation, cold is absorbed by the condenser section 16 of the heat pipe 12 which causes the vapor therein to condense, and the condensed liquid at the sub-freezing temperature then flows downward to the evaporator section 20. In this continuously automatic process of cold absorption and heat extraction, the liquid coolant 2 in the tank 14 will eventually reach temperatures below 32° F. which freezes the water within the bags 30. This constitutes the cooling and freezing process of the cold storage reservoir.

In order to prevent the penetration of summer heat to the cold storage tank 14, a layer of insulating material 38 is placed above the cover 40 of the tank 14. It is preferable that the insulating material 38 is covered by a sheet of plastic 42 which, in turn, is covered by a thick layer of soil 44. At the bottom of the tank 14 it is preferable to lay of few layers of gravel or rocks so that water from surrounding wet soil, if any, adjacent to the tank 14 can be drained.

When it is desired to use the cold that has been stored in the tank 14, the thermostatically controlled pump 50 will be set in operation. The function of pump 50 is to deliver the liquid coolant in the tank 14 through pipes 46 and 52 and entrance pipe 54 to the manifold 56 located inside the ventilation air duct 51. The delivery pipes 46 and 52 are well insulated by, e.g., conventional fiber glass pipe insulation tube. The manifold 56 is connected to a bank of tubes 58.

As the complete air-conditioning system in a cooling environment is in operation, the warm air (indicated by arrow 57) from the returning duct passes through the bank of tubes 58 and gives up the heat to the liquid coolant. Hence, the warm air 57 becomes a cooler (indicated by arrow 53) and will be recirculated throughout the house or other environment which is to be cooled. In the meantime, the coolant in the bank of tubes 58 picks up the heat from the passing warm air as it flows through the manifold 60 and insulated pipe 62 to the cold storage tank 14. Then, the cooling process cycle is repeated.

When the air-conditioned environment reaches a desired temperature by the cooling system, the pump 50 will be shut off automatically by an electronic or electromechanical thermostatic control 48 which is connected to and actuated by a temperature sensor 55 that monitors the temperature of the warm air. As mentioned previously, the same thermostat control will start the pump 50 when the present temperature of the air-conditioned environment is reached.

In order to increase the heat transfer rate between the liquid coolant 2 in the tank 14 and water 32 in the bags 30, the liquid coolant is preferably in circulation. This arrangement can be accomplished by turning the valve 59 to the position 66. In this case the liquid coolant 2 is circulated under the pressure of pump 50 through insulated pipes 46 and 68 and back to the cold storage tank 14. Since this operation is required only during cool seasons, the valve setting at position either 66 or 64 can be manually adjusted.

Figure 2:
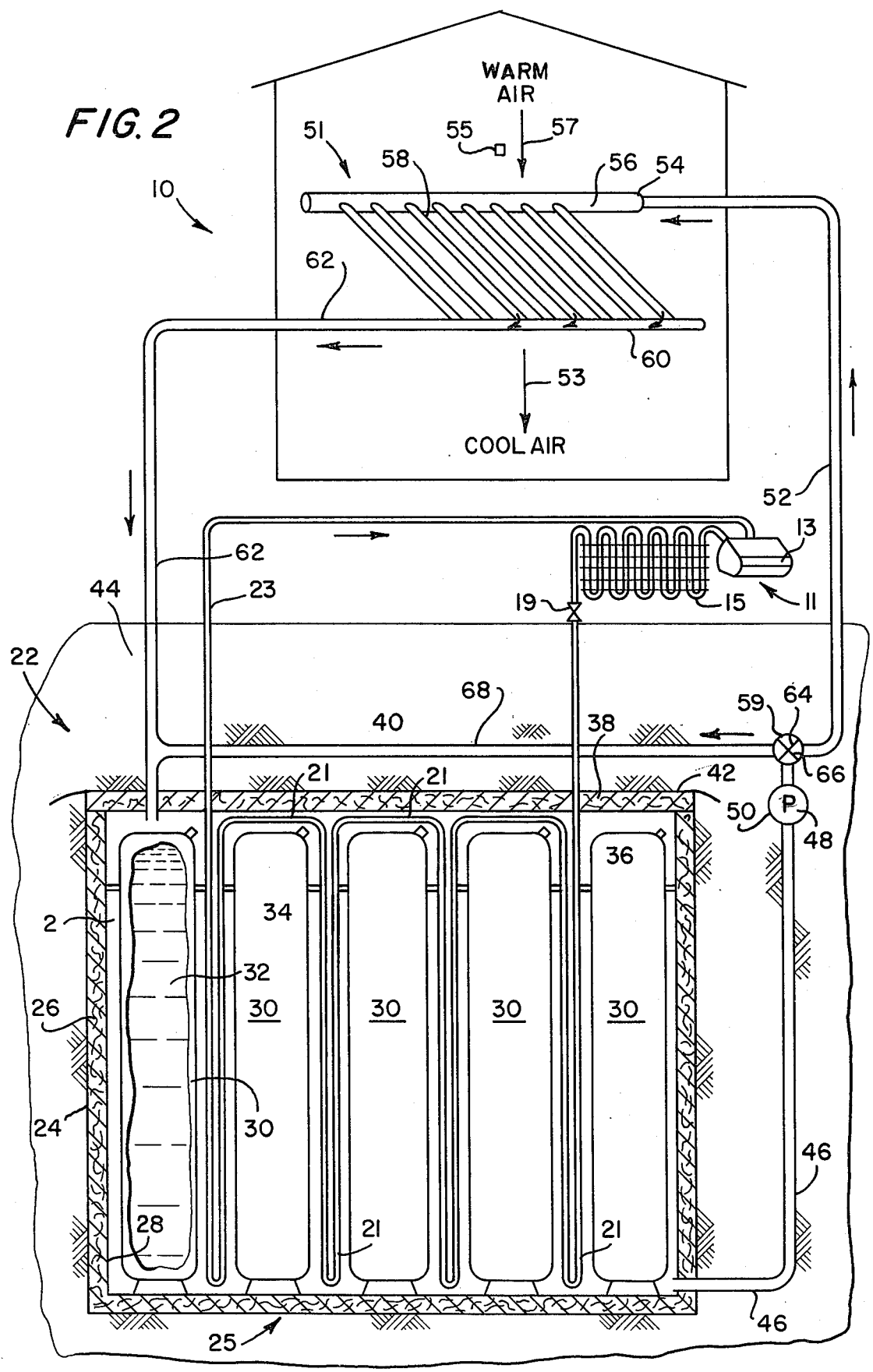
FIG. 2 is a diagrammatic section view of an alternative cold storage system using cooling coils without the use of heat pipes.

An alternative cold storage system 25 is shown in FIG. 2. In the system, all the heat pipes employed in system 14 are replaced by cooling coils 21 and all other functions here are identical to that of FIG. 1. In this case the low-pressure refrigerant vapor from the cooling coils 21 passing through passage or pipe 23 is inducted into the compressor 13, which rises the vapor in pressure and temperature for delivery to the condenser 15. After heat removal and condensation in the condenser, the liquid refrigerant passes through the expansion valve 19 to the cooling coils (evaporator) 21. In the cooling coils 21, the liquid refrigerant, vaporizes and absorbs heat from the liquid coolant 2 before being inducted into the compressor 13.

While a preferred system and a preferred combination of heat pipes or cooling coils and water bags for use in such a system have been illustrated and described, it is to be understood that various changes and arrangement of parts may be made without departing from the spirit and scope of the invention as defined in the appended claims.

I claim:

1. A system for storing and utilizing cold, said system (10,25) including a chamber (22), insulating means surrounding said chamber, an anti-freeze liquid (2) contained within said chamber, water container means (30) immersed in said anti-freeze liquid and being at least partially filled with water (32), refrigeration means (11) for cooling said anti-freeze liquid below the freezing point of water so that water (32) within said container means (30) changes phase from liquid to solid; said refrigeration means (11) including a compressor (13), a condenser (15), cooling coils (17, 21), and a refrigerant contained therein for removing heat from said anti-freeze liquid; and heat exchange means (51) including first pipe means (46, 52) for passing said anti-freeze from said chamber (22) to said heat exchanger means, second pipe means (62) for returning said anti-freeze liquid from said heat exchanger means to said chamber (22), and pump means (50) for circulating said anti-freeze liquid in said pipe means and said heat exchanger means.

2. A system as defined in claim 1 wherein said chamber is located within the earth.

3. A system as defined in claim 1 including heat pipe means (12) having a condensor section (16), an adiabatic section (18) and an evaporator section (20), said cooling coils (17) being in heat transfer contact with said condensor section (16), said evaporator section (20) being immersed in said anti-freeze liquid, and a working fluid contained within said heat pipe means, whereby said cooling coils remove heat from said working fluid and the cooled working fluid removes heat from said anti-freeze liquid.

4. A system as defined in claim 1 wherein said cooling coil means (21) has one end which is connected to and extends from said condensor (15) and is immersed in said anti-freeze liquid for removing heat therefrom, and the other end of said cooling coil means is connected to said compressor (13).

5. A system as defined in claim 1 including circulating means for circulating said anti-freeze liquid (2), said circulating means comprising a pipe (68) and a valve (59) connected to said pump for by-passing said heat exchanger means (51).

* * * * *